United States Patent [19]
McMillan

[11] Patent Number: 5,100,192
[45] Date of Patent: Mar. 31, 1992

[54] RELEASABLE TOGGLE LOCKING CONNECTING DEVICE

[76] Inventor: John H. McMillan, 465 N. 45th, #405, Seattle, Wash. 98103

[21] Appl. No.: 614,718

[22] Filed: Nov. 16, 1990

[51] Int. Cl.⁵ .............................................. B66C 1/26
[52] U.S. Cl. .............................. 294/82.31; 294/82.33
[58] Field of Search ............... 294/82.24, 82.26, 82.27, 294/82.31, 82.32, 82.33, 82.34, 118, 104; 24/116 R, 494, 513

[56] References Cited

U.S. PATENT DOCUMENTS

| | | | |
|---|---|---|---|
| 839,036 | 12/1906 | Roberts | 294/82.31 |
| 1,813,294 | 7/1931 | Hunt | 294/82.33 |
| 2,473,764 | 6/1949 | Park | 24/494 X |
| 2,595,450 | 5/1952 | Coffing | 294/82.33 |
| 2,637,088 | 5/1953 | Foster | 294/118 X |
| 2,736,599 | 2/1956 | Coffing | 294/82.31 |
| 3,923,333 | 12/1975 | Whaley | 294/104 |
| 3,979,803 | 9/1976 | Clark et al. | 24/248 |
| 4,813,731 | 3/1989 | Smith | 294/82.33 |
| 4,850,254 | 7/1989 | Burney | 81/367 |

*Primary Examiner*—Margaret A. Focarino
*Assistant Examiner*—Dean J. Kramer
*Attorney, Agent, or Firm*—Cassidy, Vance & Tarleton

[57] ABSTRACT

An improved releasable toggle locking connecting device (8) having a connecting body (10), an opposing pivoted retaining arm (18), and a multi-pivoted lock-/release lever (24) and toggle link (2) adapted to provide a secure locking connection and quick releasing while the device (8) is under tensile load.

9 Claims, 2 Drawing Sheets

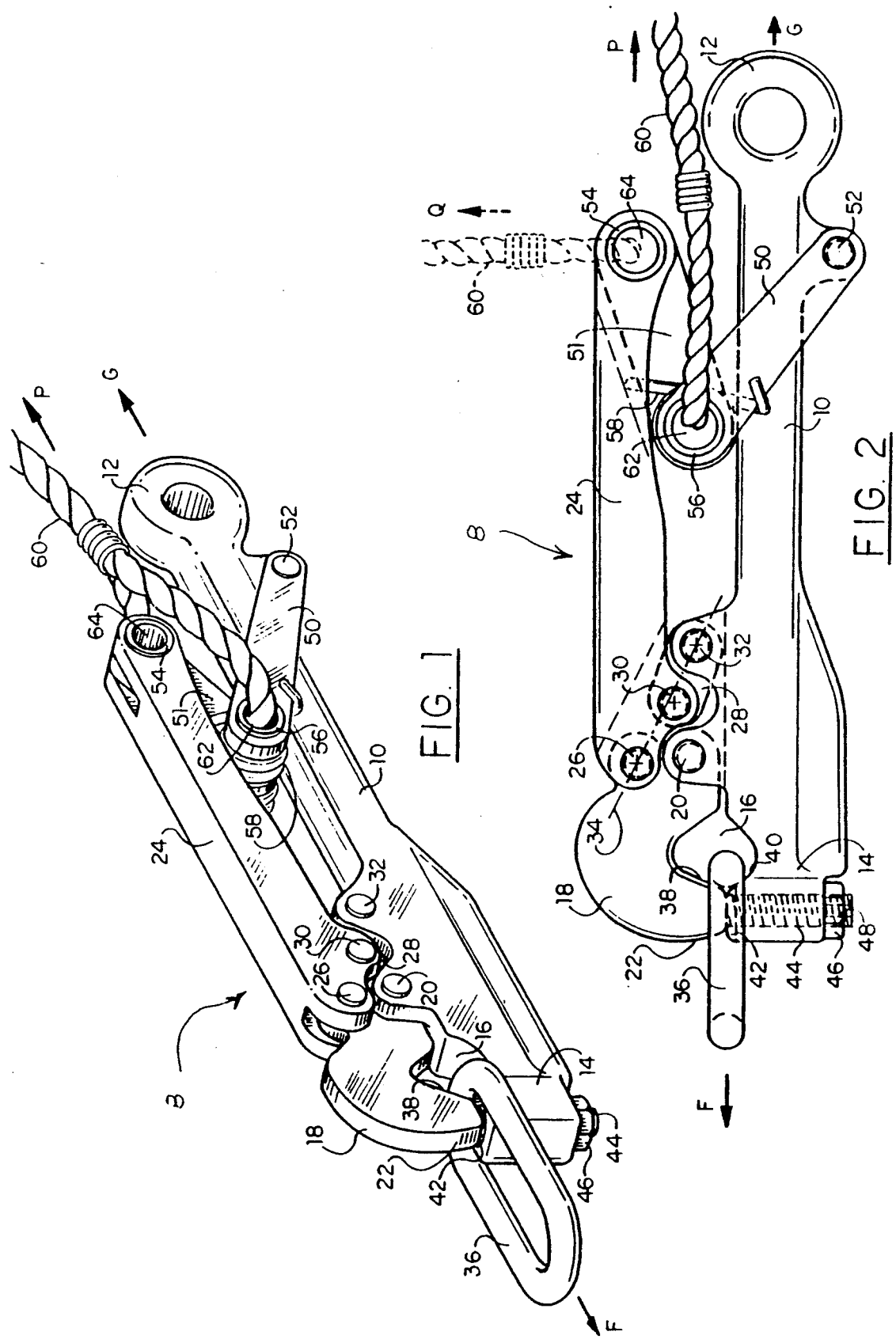

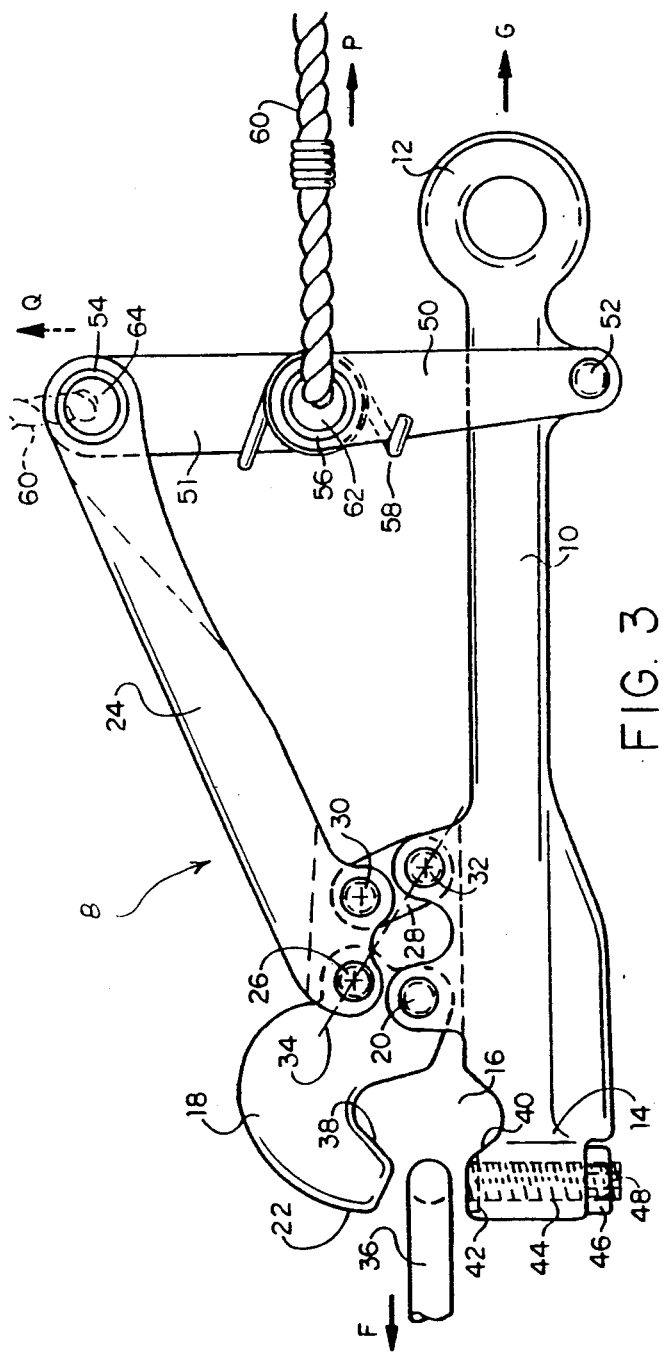
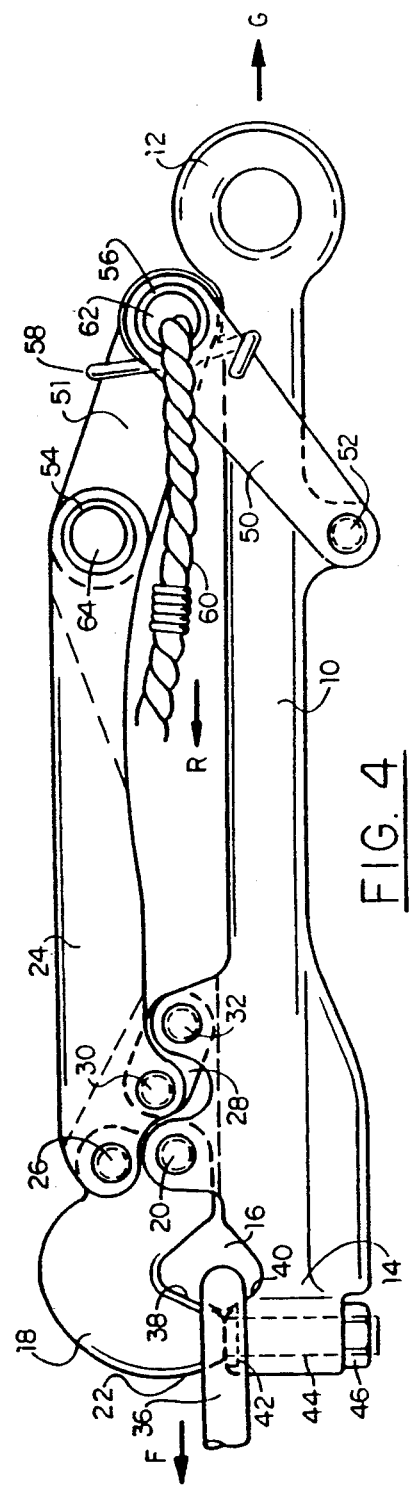

RELEASABLE TOGGLE LOCKING CONNECTING DEVICE

TECHNICAL FIELD

This invention relates to releasable connecting devices, specifically to an improved toggle locking connecting device with means adapted to combine and allow a secure locking connection and quick releasing means notwithstanding the magnitude of the connected tensile load.

BACKGROUND OF THE INVENTION

Heretofore, releasable connecting devices as applied to the commercial fishing industry utilize locking and releasing methods such as sliding load supports, spring loaded pins, pivoted latches, swivel locking arms, trip levers and, as disclosed in U.S. Pat. No. 4,813,731 issued to Smith on Apr. 21, 1989, directed to a pelican hook, and in U.S. Pat. Nos. 3,934,933; 3,979,803; and 4,850,254. These and similar methods have addressed functional locking and releasing means for light to moderate tensile loads. Unfortunately, when such methods are applied to heavy tensile loads, the release mechanisms absorb an excessive amount of the tensile load resulting in increased friction of the mechanisms requiring an inordinate amount of force by the user to release them and premature fatigue of the mechanisms that causes a decrease in the locking security of the devices.

In order to transfer this increased tensile load from the release mechanism to the connecting body of the device and still allow use of release and locking security, devices such as that taught by Smith provide compound release mechanisms to dissipate the tensile load. This results in complex and bulky devices not easily handled and costly to manufacture.

Heretofore, no lightweight releasable connecting devices have been presented which utilize a simple toggle locking and releasing mechanism as a sole means to transfer the tensile load from the releasing mechanism to the body and securely lock and release a connecting member under heavy tensile load without substantial effort by the user and undo stress to working parts of the device. Further, no releasable toggle locking connecting devices have been heretofore presented which have means to adjust the desired locking pressure of the device.

Purse seining for salmon and especially herring requires that the fishing vessel tow a powered seine skiff in order to approach and capture a school of fish. At the appropriate time the skiff is manually released from the vessel. After being connected to one end of the seine, the skiff proceeds to pull the seine from the vessel into the water. Both the skiff and the vessel cause the seine to ultimately encircle and capture the school of fish.

The skiff is releasably connected to the vessel by a connecting device located between the lines connecting the vessel's deck winch and the towed skiff. The connecting device is suspended under tension several feet above the vessel's deck by the opposing tensile forces. The connecting device typically is manually released with a release line by a crew member pulling in a direction toward himself and standing, often dangerously, in the path taken by the no-longer-suspended device as it drops to the deck or recoils toward the crew member after release has occurred.

Thus, devices, as in Smith, provide a releasing means actuated by a pulling force exerted in a single direction, often one dangerously opposing the tensile force vector applied to the connecting member.

All activities in conjunction with the approach and release of the skiff must occur in relative silence as herring in schools are prone to sound (dive) when disturbed by loud, sharp noises, thereby avoiding capture. Prior art, such as in Smith, do not show noise and shock dampening means and are therefore mechanically noisy when release occurs.

Preventing the connecting device from noisily crashing to the deck after release has occurred requires a lightweight device with a direction of release (other than a direction of release that opposes the tensile force vector applied to the connection member) that allows the user, by means of a short release line, to hold or suspend the device above the deck after release has occurred. Further, devices such as disclosed in Smith, do not provide a configuration easily rendered unobstructive to snagging when used in conjunction with fishing gear such as seines or gill nets.

SUMMARY OF THE INVENTION

The present invention is directed to a novel releasable connecting device:

(a) having a toggle locking and releasing means adapted to reduce friction to provide a device that can be released under heavy tensile load without substantial effort by the user;

(b) having a toggle locking and releasing means with a locking security that increases with increased tensile load without a substantial increase in the effort required to release the device;

(c) having few working parts that keep the device lightweight and easy to handle and relatively inexpensive to manufacture;

(d) having means to adjust the desired locking pressure of the device;

(e) offering the user a device that can be released by a pulling force exerted in a direction other than one that opposes the tensile force vector applied to the connecting member and one which can be released by a pulling force exerted in more than one direction;

(f) having a shock and noise dampening means to provide a relatively silent releasing action; and (g) having a linear configuration that is substantially free of protrusions, thus allowing a device that can be semi-enclosed in a section of rubber hose or otherwise rendered unobstructive to snagging on fishing gear such as seines or nets.

Further objects and advantages are provided in a device having a built-in safety spring presenting inadvertent release of device. Further objects and advantages are provided to enable the user to use the device that will automatically release at a specifically desired and pre-set tension level.

BRIEF DESCRIPTION OF THE DRAWINGS

The foregoing and other features advantages of the present invention will be more readily appreciated as the same becomes better understood from the detailed description when taken in conjunction with the accompanying drawings, wherein:

FIG. 1 is a perspective view of a representative embodiment of the releasable toggle locking connective device formed in accordance with the present invention;

FIG. 2 is a plan view of the device of FIG. 1 in the locked position;

FIG. 3 is a plan view of the device of FIG. 1 in a released position; and

FIG. 4 is a plan view of an alternative embodiment of a releasable toggle locking connective device formed in accordance with the present invention in the locked position.

DETAILED DESCRIPTION

Referring to FIGS. 1-3, a releasable toggle locking connecting device 8 formed in accordance with the present invention is illustrated. Ideally, the device 8 is constructed of corrosion resistant material such as silicon bronze. A one piece connecting body 10 is provided on one end with a closed eye 12, and at the other end with a fixed prong 14. A biased inner surface 40 of the fixed prong 14 defines one side of a catchment recess 16 to receive a connecting member 36. An opposing movable retaining arm 18, having a biased inner surface 38 that defines the other side of the catchment recess 16, is pivotally carried by the body 10 at a fixed pivot arm 20, which is shown as a stainless steel rivet. It is to be understood, however, that a nut and bolt or any other suitable axle member can be used at this and the other pivot points. The retaining arm 18 is pivotally mounted about the axis of pivot 20 by a movable pivot arm 26 to move between the locked position shown in FIGS. 1 and 2, in which the outer limb 22 adjoins the fixed prong 14 securely bridging the catchment recess 16, and the released position of FIG. 3, in which the outer limb 22 is drawn away from the fixed prong 14, thus opening the catchment recess 16 and allowing free release of the connecting member 36.

A movable lock/release lever 24 has an inward end pivoted to the retaining arm 18 at the movable pivot arm 26 and is pivotally carried by a movable toggle pivot 30 to pivot about the axes of the pivots 26 and 30 between the locked position of FIGS. 1 and 2 (showing the lever 24 drawn toward the body 10) and the released position of FIG. 3 (showing the lever 24 extended away from the body 10). The outward end of the lever 24 provides a leverage arm.

A movable toggle link 28 is pivotally carried by the body 10 at a fixed toggle pivot 32 to pivot about the axis of the pivot 32 by the movable toggle pivot 30 between the locked position of FIGS. 1 and 2 (showing the lever 24 drawn toward body 10) the released position of FIGS. 3 (showing the lever 24 extended away from body 10).

A recess 42 is formed into the unbiased inner surface of prong 14 at the point where the retaining arm 18 and the prong 14 adjoin in the locked position. In the center of the recess 42 is an adjustable threaded set screw 44 that is threaded through the fixed prong 14. A lock nut 46 is threaded to the outer end of the set screw 44 to bear against the outer surface of the fixed prong 14.

A set of movable release/retainer links 50 and 51 are shown having outward ends pivotally carried by the body 10 at a fixed link pivot 52 and by the outer end of the lever 24 at a movable lever pivot 54. The inward ends of the links 50 and 51 are pivotally joined at a movable link pivot 56 to pivot about the fixed link pivot 52 by a pulling force exerted in the direction of arrow P or arrow Q and an opposing retaining force exerted by a spring 58 between the locked position of FIGS. 1 and 2 and the released position of FIG. 3.

Spring 58 is encircling movable link pivot 56 to urge the release/retainer links 50 and 51 toward and into the locked position. The pulling force exerted in the direction of the arrow P is connectable at a closed eye 62 formed within the movable link pivot 56. The pulling force exerted in the direction of the arrow Q is connectable at the closed eye 64 formed within movable lever pivot 54 in the outer end of lever 24. The closed eyes 62 and 64 are adapted to receive a remote release line 60 or other suitable connector.

FIG. 4 shows the connecting device 8 of FIGS. 1 and 3 in the locked position wherein the connecting body 10 is lengthened sufficiently to allow the release/retainer links 50 and 51 to be pivoted in the opposite direction from the position shown in FIGS. 1 and 3 and the spring 58 is reversed so as to retain the pivot 56 toward the outward end of the body 10 at the eye 12.

The connecting device 8 of the present invention provides a one piece connecting body 10 that links opposing tensile force vectors F and G. The body 10 has on one end a closed eye 12 adapted to be connected to an outside structural member and a fixed prong 14 at its other end with a biased inner surface 40 that defines one side of the catchment recess 16 for receiving a connecting member 36 that is adapted to be connected to another part.

The retaining arm 18 is pivotally carried at the fixed pivot arm 20 and is pivoted by the movable pivot arm 26 between the locked position (shown in FIGS. 1 and 2), in which the outer limb 22 adjoins the fixed prong 14 to securely bridge the catchment recess 16 and hold the connecting member 36, and the released position (shown in FIG. 3), in which the outer limb 22 is drawn away from the fixed prong 14 to open the catchment recess 16, thus allowing free release of the connecting member 36.

The movable lock/release lever 24 has an inward end pivotally mounted on to the arm 18 on the pivot 26, and on the toggle link 28 at the pivot 30 to pivot about both pivot axes between the locked position, wherein it is drawn toward the body 10 to secure the connecting member 36, and the released position, wherein it is extended away from the body 10 while opening the arm 18 and the catchment recess 16 to thereby release the connecting member 36. The outward end of the lever 24 provides a leverage arm, the length of which is sufficient to manually release the device 8.

The movable toggle link 28 is pivoted on the body 10 at the fixed pivot 32 and the lever 24 at the movable pivot 30 between the locked position, wherein it is drawn toward the body 10, and the released position of FIG. 3, wherein it is extended away from the body 10. The toggle link 28 is adapted such that its pivotal movement in relation to the lock/release lever 24 and the retaining arm 18 enables the axis of the toggle pivot 30 to cross an over-center line 34 that connects the axes of the pivots 32 and 26. Thus, in the locked position of FIGS. 1 and 2, a secure closure of the catchment recess 16 is formed, thereby securing member 36 just after the axis of the pivot 30 has crossed the line 34 to the locking side of line 34. Similarly, in the released position shown in FIG. 3, the catchment recess 16 is opened just after the axis of the pivot 30 has crossed the line 34 to the releasing side of the line 34 thereby releasing member 36.

In the locked position of FIGS. 1 and 2, the relationship of the lever 24, the toggle link 28, and the body 10 is such that no further movement of the toggle link 28 will occur. Any increased tension applied in the direction of the force vectors F and G to the connecting member 36 and partially applied to the arm 18 will further tool block or lock up all moving parts of the device 8 to provide a secure locking connection.

As the lever 24 causes the movable toggle pivot 30 to undergo over-center movement to the releasing side of the line 34, tension applied at the force vectors F and G by the member 36 to the biased inside surface 38 of the arm 18 and the biased inside surface 40 of the prong 14 will then urge further releasing movement to all working parts of the device 8. The biased inside surfaces 38 and 40 are formed so that tension at force vector F applied to member 36 is equally distributed between the body 10 and the arm 18, thereby reducing undo stress and friction to moving parts of the device 8 and facilitating ease in releasing the device 8.

The adjustable threaded set screw 44, threaded through the fixed prong 14 at the recess 42, has a length such that when the lock nut 46 is firmly threaded to the outer end of the set screw 44 against the outer surface of the fixed prong 14 (after pre-setting it in the position of the set screw 44 by means of an allen wrench (not shown) and allen wrench socket 48), the end surface of the outer limb 22 is within the recess 42 of the fixed prong 14 and in contact with the inner end of the set screw 44, at which time the desired locking pressure of the device 8 is achieved. Hence, variable degrees of locking pressure and releasing force required to release the device 8 is provided herein.

In order to increase the locking pressure of the device 8, the set screw 44 is threaded inwardly toward the outer limb 22 of the arm 18 into the recess 42, but not beyond, so as to obstruct the release of the member 36. In the locked position, the maximum desired locking pressure is achieved by reducing the distance between the axis of the pivot 30 and the line 34 on the locking side of the line 34. Similarly, in order to decrease locking pressure, the set screw 44 is threaded outwardly away from, but still in contact with, the outer limb 22 of the arm 18. In the locked position, the minimum desired locking pressure is achieved by increasing the distance between the axis of the pivot 30 and the line 34 on the locking side of the line 34.

One method urging the lever 24 toward and into the released position is illustrated in FIGS. 1 and 3. The movable release/retainer links 50 and 51 are movably joined at the pivot 56 such that a pulling force exerted in the direction of the force arrows P or Q and an opposing force exerted by the spring 58 urges the lever 24 between the released position of FIG. 3 and the locked position of FIGS. 1 and 2. The length of the links 50 and 51 and the positioning of the pivots 52, 54, and 56 are formed such that in the released position of FIG. 3, the lever 24 is allowed to extend away from the body 10 up to but not beyond the point at which the recess 16 is opened sufficient to allow free release of the connecting member 36. Thus, the links 50 and 51, combined with the tensile force of the spring 58, serve to dampen and brake the outward movement of the lever 24, preventing damage to it or other parts when the device 8 is released under heavy tension loads. The spring 58 not only serves to urge and return the pivot 56 toward its desired locking position following release of the member 36 and reduction of pulling forces at P and Q, but also serves to provide a safety spring that prevents inadvertent release of the device while in the locked position.

The movable pivots 54 and 46, being the points upon which the pulling forces in the direction of arrows P and Q are exerted, are provided with closed eyes 62 and 64 respectively to receive remote release line 60 or other pulling force connector. The user of the present invention is provided with a device that can be safely and remotely released by a pulling force exerted either in the direction of arrow P or by a pulling force exerted in the direction of arrow Q, more or less perpendicular to the direction of arrow P.

A third pulling force direction of release is disclosed in FIG. 4, wherein the body 10 of the device 8 is lengthened to permit the links 50 and 51 to be pivoted in the opposite direction from the position shown in FIGS. 1 and 3 and the spring 58 is biasing the pivot 56 toward the outward end of the body 10 at the eye 12. Thus, the device can be released by a pulling force exerted in the direction of arrow R, providing yet a third direction whereby the device can be released, one that is opposite from that shown by arrow P.

The embodiment of FIG. 4 also discloses links 50 and 51 that can be pivoted in either the direction shown in FIG. 4 or in the direction shown in FIGS. 1 and 3. The user of this embodiment is provided with a device adapted to offer releasability in more than one direction as desired by the user.

The connecting device 8 described herein can be adapted to provide the user with a device that will automatically disconnect or release at a specifically desired tension level. This is accomplished by repositioning the tensile force vector G to the closed eye 62 instead of to the eye 12. The desired tension level at which the device 8 will release the member 36 is adjustable at set screw 44. When the desired tension level is reached, the tensile force at G as applied to the closed eye 62, acting as the pulling force P, urges the device 8 into the released position (shown in FIG. 3).

As will be readily appreciated from the foregoing description, a number of advantages evident in the releasable toggle locking connecting device include:

(a) having a toggle locking and releasing means adapted to reduce friction such that the device can be released under heavy tensile load without substantial effort by the user;

(b) having a toggle locking and releasing means with locking security that increases with increased tensile load without a substantial increase in the effort required to release the device;

(c) having few working parts and thus, is lightweight and easy to handle and relatively inexpensive to manufacture;

(d) having means to adjust the desired locking pressure of the device;

(e) offering the user a device which can be released by a pulling force exerted in a direction other than one which opposes the tensile force vector applied to the connecting member and one which can be released by a pulling force exerted in more than one direction;

(f) having a shock and noise dampening means whereby a relatively silent releasing action is provided;

(g) having a linear configuration substantially free of protrusions to provide a device that can be semi-enclosed in a section of rubber hose or otherwise rendered unobstructive to snagging on fishing gear such as seines or nets;

(h) having a built-in safety spring preventing inadvertent release of the device; and (i) easy adaptability to provide the user with a device that is usable where a connecting device is desired that will automatically release at a specifically desired and pre-set tension level.

It must be understood that the form of the present invention as described herein is to be taken as a representative embodiment of the same and that changes may be made in the shape, size and configuration without departing from the spirit and the scope of the invention. For instance, the outer limb 22 of the arm 18 and the recess 42 of the prong 14 may be formed to have a groove such that when the arm 18 and the prong 14 are in the locked position they will grip a cable. Consequently, the invention is to be limited only by the scope of the appended claims.

The embodiments of the invention in which an exclusive property or privilege is claimed are defined as follows:

1. A releasable connecting device, comprising:

a connecting body linking opposing tensile force vectors comprising a securing means on a securing end of said body and a fixed prong on an opposing end of said body having a biased inner surface to define one side of a catchment recess;

an opposing movable retaining arm means having a biased inner surface defining the other side of said catchment recess and being pivotally carried by said body at a fixed pivot arm pin and by a movable pivot arm pin; said retaining arm means being movable between a locked position and a released position wherein when said retaining arm means is moved toward and into said locked position, said retaining arm means forming a secure closure of said recess to thereby secure within said recess a connecting member adapted to be connected to another part, and further wherein when said retaining arm means is moved toward and into said released position to extend from said body, an opening in said recess is formed to thereby release said connecting member;

a movable lock/release lever means having an inward end pivotally mounted on said retaining arm means at said movable arm pivot pin and to a movable toggle link at a movable toggle pivot pin; said lock/release lever means being movable between a locked position and a released position, wherein when said lock/release lever means is moved toward said body and into said locked position, said retaining arm means is moved by said lock/release lever means toward and into said locked position resulting in the secure locking of said connecting member within said recess, and further wherein when said lock/release lever means is moved into said released position such that said lock/release lever means is extended away from said body, said retaining arm means is moved by said lock/release lever means toward and into said released position to open said recess and release said connecting member from said recess;

said movable toggle link having an inward end pivotally attached to said body at a fixed toggle pivot pin and an outward end pivotally attached to said lock/release lever means at said movable toggle pivot pin; said movable toggle link being movable between a locked position and a released position and adapted in relation to said lock/release lever means whereby pivotal movement allows the axis of said movable toggle pivot pin to cross an over-center line connecting the axes of said fixed toggle pivot pin and said movable pivot arm pin; wherein when said toggle link is moved by said lock/release lever means toward and into said locked position, a resultant secure closure of said recess is formed to secure said connecting member just after the axis of said movable toggle pivot pin has crossed said over-center line to a locking side of said center line; and further wherein when said toggle link is moved by said lock/release lever means toward and into said released position, a resultant opening of said recess is formed without substantial effort by the user to release said connecting member just after the axis of said movable toggle pivot pin has crossed said over-center line to the releasing side of said center line;

a locking pressure adjustment means whereby variable degrees of locking pressure is provided, said locking pressure adjustment means comprising a threaded set screw threaded through said fixed prong and in contact with said retaining arm means when the device is in said locked position; and releasing means to urge said lock/release lever means from said locked position toward and into said released position without substantial effort by a user, and a retaining means for preventing said lock/release lever means from exceeding said released position further than that required to release the connecting member from said catchment recess, said releasing means and said retaining means comprising in combination a set of movable release/retainer links pivotally mounted on said body at a fixed link pivot pin and on said lock/release lever means at a movable lever pivot pin, and further being movably joined at a movable link pivot pin, whereby action of a pulling force on said movable link pivot pin in a direction approximately parallel to a longitudinal axis of said body urges said lock/release lever means toward and into said released position and retains said lever from exceeding said released position.

2. The device of claim 1, further comprising:

biasing means attached to said lock/release lever means for dampening shock and noise whereby shock damage to said lock/release lever means and noise is prevented during release, a lock/release lever return means for urging said lock/release lever means to return toward said locked position from said released position, and a safety means for preventing inadvertent release of the device while the device is in said locked position.

3. The device of claim 2, wherein said shock and noise dampening means, said lock/release lever return means, and said safety means comprise a spring means for urging said release/retainer links toward and into said locked position.

4. The device of claim 1, further comprising a pulling force securing means for applying a pulling force to said movable link pivot pin.

5. The device of claim 1, further including a reversible spring means, whereby the pulling force connected to said movable link pivot pin can be acting in two opposing directions approximately parallel to the axis of said body in order to urge said lock/release lever means toward and into said released position according to the direction of the pulling force as desired by a user.

6. The device of claim 5, wherein said securing means comprises a closed eye at or near said movable link pivot pin to enable attachment of a remote release line.

7. The device of claim 1, wherein the device is adapted to provide an automatically releasing mechanism such that the connecting member is released at a specifically desired tension level, said level being adjustable at said threaded set screw.

8. The device of claim 1, wherein said securing means comprises a closed eye at an outward end of said lock/release lever means, such that the pulling force connected to said lock/release lever means is acting in a direction at a right angle to a line parallel to the axis of said body in order to urge said lock/release lever means toward and into said released position.

9. The device of claim 1, wherein said biased inside surface of said fixed prong and said biased inside surface of said retaining arm means are formed such that when in said locked position, tension applied by said connecting member to said surfaces is equally distributed between said body and said retaining arm means, thereby reducing undo stress and friction to moving parts of said device and substantially easing the effort required to release the device.

* * * * *